United States Patent Office 3,502,643
Patented Mar. 24, 1970

3,502,643
DIS AZO IMIDE CONTAINING DYESTUFFS
Walter Horstmann, Cologne-Buchheim, Germany, and Edgar Siegel, Leverkusen, Germany, assignors to Farbenfabriken Bayer Aktiengesellschaft, Leverkusen, Germany, a corporation of Germany
No Drawing. Filed Oct. 24, 1966, Ser. No. 588,708
Claims priority, application Germany, Nov. 2, 1965, F 47,574
Int. Cl. C09b 31/10
U.S. Cl. 260—152                     8 Claims

ABSTRACT OF THE DISCLOSURE

Azo dyestuffs which correspond to the formula:

R—HN—OC\\
         CH—N=N—[ring]—N—A—N—[ring]—N=N—HC\\
H$_3$COC/                                                                  \\COCH$_3$
R—HN—OC ... CO—NH—R
(X)$_m$ ... (X)$_m$ in which R stands for identical or different radicals selected from the group consisting of aromatic and heterocyclic radicals, the radicals X stand for identical or different substituents, $m$ stands for integers from 0 to 3, and A represents a member taken from the class consisting of aliphatic, aromatic, and heterocyclic radicals. The dyestuffs are free from sulphonic acid groups and may be used as pigment dyestuffs for the coloring of plastics, lacquers, pigment pastes, and printing inks.

---

The object of the present invention is to provide valuable new azo dyestuffs which are free from sulphonic acid groups and correspond to the general formula R—HN—OC\\
     CH—N=N—[ring]—N—A—N—[ring]—N=N—HC—COCH$_3$\\
H$_3$COC/                                                                      CO—NH—R
(X)$_m$                             (X)$_m$
(I)

in which R denotes identical or different optionally substituted aromatic or heterocyclic radicals, the radicals X are identical or different substituents, $m$ stands for integers from 0 to 3, and A is an aliphatic, araliphatic, aromatic or heterocyclic radical; by definition, the dyestuffs are free from sulphonic acid groups.

The radicals R may be mono- or polynuclear; radicals of the benzene and naphthalene series are preferred. Examples are the following radicals: phenyl; 2- or 3- or 4-methylphenyl-1; 2- or 3- or 4-chlorophenyl-1; 2- or 3- or 4-methoxyphenyl-1; 2-methyl-4-chlorophenyl-1; 2,4-dimethylphenyl-1; 3-nitro-phenyl-1 and 2,5-dimethoxy-4-chlorophenyl-1 radicals.

Suitable substituents X are, for example: lower alkyl substituents, such as methyl, chloro or nitro substituents; lower alkoxy substituents, such as —OCH$_3$ or —OC$_2$H$_5$; fluoro, methyl-sulphonyl, trifluoromethyl and carbethoxy substituents.

Examples of radicals A are:

1,4-phenylene;
4,4'-diphenylene;
2,2'-dichloro-4,4'-diphenylene;
3,3'-dichloro-4,4'-diphenylene;
3,3'-dimethyl-4,4'-diphenylene;
3,3'-dimethoxy-4,4'-diphenylene; and
1,2-ethylene radicals.

A preferred group of dyestuffs in the range of the products of the general Formula I corresponds to the formula $$\left[ \begin{array}{c} R_3 \\ R_2 \diagdown \diagup \text{—HN—OC} \\ R_1 \quad\quad\quad \diagdown \text{CH—N=N—[ring]—N—A} \\ \quad\quad\quad\quad H_3COC \diagup \end{array} \right]_2 \quad (Ia)$$

in which R$_1$ stands for hydrogen, or for methyl, chloro- nitro or methoxy substituents, R$_2$ for hydrogen, or for methyl, chloro or nitro substituents, R$_3$ for hydrogen or for chloro substituents, and A for an aliphatic, araliphatic, aromatic or heterocyclic radical; the dyestuffs are free from sulphonic acid groups.

The new azo dyestuffs are obtained, when azo compounds of the formula

R—NH—OC\\
      CH—N=N—[ring]—C(=O)—OH\\
H$_3$COC/                                   C(=O)—OH
(X)$_m$
(II)

in which R, X and $m$ have the same meaning as above, or functional derivatives of these azo-dicarboxylic acids, especially the mono- or diesters, mono- or diamides, dicarbonimides or anhydrides, are reacted with diamines of the general formula

H$_2$N—A—NH$_2$     (III)

in which A has the same meaning as above, in a molar ratio of components (II) to component (III) of approximately 2:1, in the presence of acidic condensation agents, the components being so chosen that the final dyestuffs are free from sulphonic acid groups.

The reaction of the starting components is preferably carried out in a high-boiling organic solvent or solvent mixture, and the components themselves may also serve as organic solvents. The condensation takes place at an elevated temperature, generally in the range of 80–240° C., preferably between 130° C. and 180° C.

The monoazo compounds of the general Formula II are prepared in the usual manner by diazotising the optionally substituted 3-amino-phthalic acids or their functional derivatives, and coupling with suitable acetoacetic acid amides, the components being free from sulphonic acid groups. Diazo components which can be used for the preparation of the azo compounds (II) are, for example:

3-amino-phthalic acid;
3-amino-phthalic acid mono- and diesters, such as 3-amino-phthalic acid monomethyl ester-(1) or 3-amino-phthalic acid dimethyl ester;
3-amino-phthalimide;
3-amino-6-methyl-phthalic acid;
3-amino-5-nitro-phthalic acid;
3-amino-6-nitro-phthalic acid;
3-amino-6-methoxy-phthalic acid;
3-amino-6-chloro-phthalic acid;
3-amino-4-methoxy-phthalic acid;
3-amino-6-bromo-phthalic acid;
3-amino-6-fluoro-phthalic acid;
3-amino-5,6-dimethoxy-phthalic acid;
3-amino-4,5,6-trimethoxy-phthalic acid;
3-amino-5,6-methylene-dioxide-phthalic acid;
3-amino-5-cyano-phthalic acid;
3-amino-6-cyano-phthalic acid;
3-amino--5-methoxy-6-ethoxy-phthalic acid;
3-amino-6-methylsulphonyl-phthalic acid;
3-amino-4-methyl-phthalic acid;
3-amino-5-carbethoxy-phthalic acid;
3-amino-6-carbethoxy-phthalic acid.

Coupling components which can be used for synthetising the monoazo compounds (II) are, for example:

acetoacetic acid anilide;
acetoacetic acid-2-chloro-anilide;
acetoacetic acid-2,4-dimethyl-anilide;
acetoacetic acid-2-methyl-anilide;
acetoacetic acid-2,5-dimethoxy-4-chloro-anilide;
acetoacetic acid-2-methoxy-anilide;
acetoacetic acid naphthyl-(1)-amide;
acetoacetic acid-2-methyl-3-chloro-anilide;
acetoacetic acid-4-methyl-anilide;
acetoacetic acid-2-methyl-4-chloro-anilide;
acetoacetic acid-2,5-dichloro-anilide;
acetoacetic acid-2,4-dichloro-anilide;
acetoacetic acid-2-nitro-4-chloro-anilide;
acetoacetic acid-2-nitro-4-methyl-anilide;
acetoacetic acid-2-nitro-anilide;
acetoacetic acid-2-nitro-4-methoxy-anilide;
acetoacetic acid-2-methoxy-4-nitro-anilide;
acetoacetic acid-2-chloro-4-nitro-anilide;
acetoacetic acid-2,4-dinitro-anilide;
acetoacetic acid-4-nitro-anilide;
acetoacetic acid naphthyl-(2)-amide;
acetoacetic acid-2,4,5-trichloro-anilide;
acetoacetic acid-2-methyl-5-nitro-anilide;
acetoacetic acid-2-methoxy-5-nitro-anilide;
acetoacetic acid-3-nitro-anilide;
acetoacetic acid pentachloro-anilide;
acetoacetic acid-2-methyl-4-nitro-anilide;
acetoacetic acid-2-methyl-5-nitro-anilide;
acetoacetic acid-2-methyl-5-chloro-anilide;
acetoacetic acid-3-chloro-anilide;
acetoacetic acid-4-ethoxy-anilide;
acetoacetic acid-2,4-dimethyl-5-chloro-anilide;
acetoacetic acid-2-(6-ethoxy-benzothiazolyl)-amide;
acetoacetic acid-2-(benzothiazolyl)-amide.

The corresponding alkyl, aryl or aralykyl mono- and diesters and the anhydrides or imides of the above substituted phthalic acids can also be used with advantage. The esters have the advantage of being readily soluble in a high-boiling organic solvent used for the condensation.

The following aliphatic, araliphatic, aromatic and heterocyclic diamines, for example, are used for the condensation of the monoazo compounds (II) with the diamines (III) which is carried out according to the invention in high-boiling organic solvents with the addition of acidic condensation agents:

1,2-ethylene-diamine;
4,4'-diamino-diphenyl;
2,2'-dichloro-4,4'-diamino-diphenyl;
3,3'-dichloro-4,4'-diamino-diphenyl;
2-nitro-4,4'-diamino-diphenyl;
3,3'-dimethoxy-4,4'-diamino-diphenyl;
3,3'-diethoxy-4,4'-diamino-diphenyl;
3-methyl-4,4'-diamino-diphenyl;
3,3'-dimethyl-4,4'-diamino-diphenyl;
3,3'-dimethyl-4,4'-diamino-6,6'-dinitro-diphenyl;
2,2'-dimethyl-4,4'-diamino-diphenyl;
2,2'-dichloro-4,4'-diamino-5,5'-dimethoxy-diphenyl;
2,2',5,5'-tetrachloro-4,4'-diamino-diphenyl;
3,3',5,5'-tetrachloro-4,4'-diamino-diphenyl;
3,3',5,5'-tetramethyl-4,4'-diamino-diphenyl;
perchloro-4,4'-diamino-diphenyl;
1,4-diamino-benzene;
1,3-diamino-benzene;
2-chloro-1,4-diamino-benzene;
2,5-dichloro-1,4-diamino-benzene;
2,6-dichloro-1,4-diamino-benzene;
2-nitro-1,4-diamino-benzene;
2,5-diethoxy-1,4-diamino-benzene;
2-methyl-5-methoxy-1,4-diamino-benzene;
tetrachloro-p-phenylene-diamine;
tetrachloro-m-phenylene-diamine;
4,4'-diamino-diphenyl ether;
4,4'-diamino-diphenyl-sulphone;
3,3'-diamino-4,4'-dichloro-diphenyl-sulphone;
3,3'-diamino-4,4'-dimethoxy-diphenyl-sulphone;
4,4'-diamino-diphenylketone;
3,3'-diamino-diphenylketone;
3,3'-diamino-4,4'-dichloro-diphenylketone;
3,3'-diamino-4,4'-dimethoxy-diphenylketone;
4,4'-diamino-diphenylmethane;
3,3'-diamino-diphenylmethane;
4,4'-diamino-3,3',5,5'-tetrachloro-diphenylmethane;
4,4'-diamino-stilbene;
4,4'-diamino-benzanilide;
4,4'-diamino-diphenyl-ethane (sym.);
4,4'-diamino-azobenzene;
2,8-diamino-chrysene;
1,4-diamino-napthalene;
1,5-diamino-naphthalene;
2,6-diamino-naphthalene;
2,7-diamino-naphthalene;
2-(4'-amino-phenyl)-5-amino-benzotriazole;
2,5-(4,4'-diamino-phenyl)-oxdiazole;
4,4'-diamino-diphenyl-urea;
3,3'-dimethoxy-4,4'-diamino-stilbene;
2,6-diamino-benzothiazole;
2-(4'-amino-phenyl)-6-amino-benzothiazole;
2,7-diamino-fluorene;
2,7-diamino-diphenylene-oxide;
2,7-diamino-diphenylene-sulphone;
2,5-(4,4'-diamino-phenyl)-thiadiazole;
2,5-(4,4'-diamino-phenyl)-triazole.

The following solvents boiling above 100° C. may be mentioned, by way of examples, for the condensation of the monoazo compounds (II) with the diamines (III) in high-boiling organic solvents: glacial acetic acid, toluene, xylenes, chlorobenzene, o-, m-, p-dichlorobenzene, 1,2,3-, 1,2,4- and 1,2,5-trichlorobenzene, nitrobenzene, quinoline and mixture of such solvents.

Suitable condensation agents are, for example: acetic acid, propionic acid, mono-, di- and trichloro-acetic acid, hydrochloric acid, sulphuric acid, ortho-phosphoric acid, aluminium chloride, ferric chloride, zinc chloride and anhydrous sodium acetate.

The reaction of the dicarboxy-azo compounds (II) or their functional derivatives with the diamino components (III) is carried out in a ratio of approximately 2:1. A slight excess of the components (II) is frequently desirable in order to react the component (III) completely.

Symmetrical or asymmetrical dyestuffs of the formula (I) can be synthetised, dependent upon the choice of the components (II). To produce the preferred group of dyestuffs of the Formula Ia, a diamine of the Formula III is condensed with an azo-dicarboxylic acid of the formula

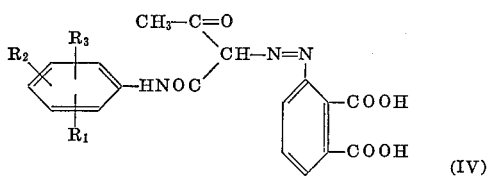

(IV)

in which the radicals $R_1$, $R_2$ and $R_3$ have the same meaning as above, under the stated conditions in a ratio of approximately 1:2.

The products obtained by the present process are hardly soluble to insoluble in water. They are valuable pigment dyestuffs the shades of which are predominantly in the yellow to yellow-red range. The dyestuffs are usually obtained in crystalline form with good yields.

The dyestuffs are characterised by good fastness to solvents, light and migration and by good stability to temperature and are preferably used for colouring plastics, for example polyvinylchloride, acrylonitrile-styrene-butadiene-copolymerisates and -graft-copolymerisates, lacquers or papers, and for producing printing inks and pigment pastes.

Belgian patent specification No. 652,251 already mentions pigment dyestuffs of the general formula

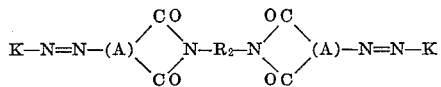

in which K is defined as the radical of any coupling component, A as an aromatic or heterocyclic system and $R_2$ as a bivalent alkyl, aryl, aralkyl or hetero radical.

However, this patent specification does not contain a single example of a dyestuff of the general formula stated therein and not even an example for only one of the components K, A or $R_2$. The patent specification otherwise contains only a few, very general statements regarding processes for the production of the pigment dyestuffs.

The following examples are given for the purpose of illustrating the invention; the parts are parts by weight and the temperatures are given in degrees centigrade.

EXAMPLE 1

47.7 parts 3-amino-phthalic acid are suspended in 500 parts water, 83 parts concentrated hydrochloric acid are added and the mixture is diazotised at 0–5° with a solution of 18.3 parts sodium nitrite in 50 parts water. The excess nitrite is removed by means of amidosulphonic acid.

The diazo suspension is added portionwise at 5–10° to a solution of 56 parts acetoacetic acid-2-chloroanilide in 250 parts ethanol, which has been mixed with a solution of 45 parts caustic soda in 80 parts water. When the coupling is completed, the reaction mixture is acidified (pH 1–2), the yellow dystuff is filtered off with suction, washed with water until free from acid and dried in a drying cabinet at 60–80°. There are thus obtained 90 parts mono- azo-o-dicarboxylic acid which in the form of the free acid corresponds to the formula

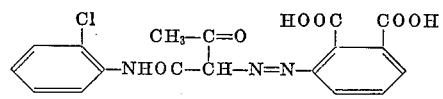

For conversion into the corresponding anhydride, the dry powdered monoazo-o-dicarboxylic acid is suspended in 500 parts chlorobenzene, 50 parts acetic anhydride are added and the mixture is heated at about 120° for 3–4 hours. The anhydride which is precipitated in crystalline form is filtered off with suction at room temperature, washed with light petrol and dried at 80° in a drying cabinet. From 90 parts dicarboxylic acid there are obtained 68 parts anhydride, M.P. 275–277°.

8.50 parts of the monoazo-o-dicarboxylic anhydride and 1.08 parts phenylene-diamino-1,4 are suspended in 550 parts o-dichlorobenzene, 50 parts glacial acetic acid are added and the mixture is slowly heated to 140°.

During heating, a clear solution first results, then, after about one hour, the hardly soluble pigment begins to separate. The mixture is heated for about 25 hours, then cooled to 40–60°, the product is filtered off with suction, washed with 100 parts chlorobenzene at 70–80°, and subsequently with light petrol, and dried at 80° in a drying cabinet. The yield is 7.5 parts of the greenish yellow pigment of the formula

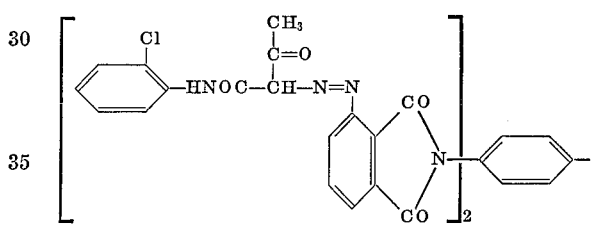

The pigment so obtained has a very good fastness to lacquer coating at 130° and 170°. The fastness to light is also very good.

EXAMPLE 2

38.3 parts 3-amino-phthalic acid are suspended in 400 parts water, 72 parts concentrated hydrochloric acid are added and the mixture is diazotised at 0–5° with a solution of 14.7 parts sodium nitrite in 50 parts water. The excess nitrite is removed by means of amidosulphonic acid.

The resultant diazo suspension is added portionwise to a solution of 48 parts acetoacetic acid-2-methyl-4-chloro-anilide in 200 parts ethanol, which has been mixed with a solution of 34 parts caustic soda in 65 parts water, so that the temperature remains between 5 and 10°. As soon as the coupling is completed, the mixture is adjusted to pH 1–2 by the addition of 10% hydrochloric acid, the dyestuff is filtered off with suction, washed with water until free from acid, and dried in a drying cabinet at 80°. The yield is 85 parts dyestuff-o-dicarboxylic acid.

The dicarboxylic anhydride of the dyestuff is obtained by heating with 50 parts acetic anhydride in 500 parts chlorobenzene at 110–120° for 3–4 hours, M.P. 315°.

9.0 parts of the dyestuff-o-dicarboxylic acid or 8.5 parts of the anhydride are suspended in 500 parts o-dichlorobenzene, 1.84 parts 4,4'-diamino-diphenyl and 50 parts glacial acetic acid are added and the mixture is heated to 140°. The starting components are thereby first completely dissolved. After about 30 minutes a hardly soluble product begins to separate. The mixture is kept at 140° for 25 hours in all, then cooled to 60°, the product is filtered off with suction, washed with 300 parts chlorobenzene at 70–80° and then with light petrol, and dried at 80° in a drying cabinet. This method yields 8.7 parts of a greenish yellow pigment dyestuff of very good fastness to light and lacquer coating.

EXAMPLE 3

47.7 parts 3-amino-phthalic acid are suspended in 500 parts water, 83 parts concentrated hydrochloric acid are added and the mixture is diazotised at 0–5° with a solution of 18.3 parts sodium nitrite in 50 parts water. The excess nitrite is removed by means of amidosulphonic acid.

A solution of 45 parts caustic soda in 80 parts water is added to a suspension of 51 parts acetoacetic acid-2-methylanilide in 250 parts ethanol, the mixture is cooled to 5–10° and the above diazo suspension is added in portions. As soon as the coupling is completed, the mixture is acidified with hydrochloric acid (1:1, pH 1–2), the product is filtered off with suction, washed with water until free from acid and dried in a drying cabinet at 80°. The yield of monoazo-o-dicarboxylic acid is 91 parts.

By heating with 500 parts chlorobenzene and 50 parts acetic anhydride at 110–120° for 3–4 hours, cooling to 10°, filtering off with suction, washing the residue with light petrol and drying, there are obtained 66 parts monoazo-o-dicarboxylic acid anhydride, M.P. 273–276°.

8.5 parts monoazo-o-dicarboxylic acid or 8.0 parts of the anhydride are suspended in 500 parts o-dichlorobenzene and 50 parts glacial acetic acid, 0.6 part ethylenediamine is added and the mixture is then heated at 140° for 25 hours.

The mixture is subsequently cooled to 60°, the precipitated yellow pigment is filtered off with suction, washed with 120 parts chlorobenzene at 80° and then with light petrol, and then dried in a drying cabinet at 80°.

Yield: 6.9 parts of pigment with very good fastness properties.

Valuable yellow to brown pigment dyestuffs are also obtained, when the procedures described in these examples are followed, but, instead of the diazo components, coupling components and diamines there specified, there are used the diazo and coupling components and the diamines listed in the following Table, the dyestuffs from 3-amino-phthalic acid and the stated coupling components being employed in the form of the free dicarboxylic acid or of the anhydride.

| Diazo component | Coupling component | Diamine |
|---|---|---|
| 3-amino-phthalic acid | Acetoacetic acid-2 chloro-anilide | Ethylene-diamine. |
| Do | do | 4,4'-diamino-diphenyl. |
| Do | do | 1,3-diamino-benzene. |
| Do | do | 2,2'-dichloro-4,4'-diamino-diphenyl. |
| Do | do | 3,3'-dichloro 4,4'-diamino-diphenyl. |
| Do | do | 3,3'-dimethyl-4,4'-diamino-diphenyl. |
| Do | do | 3,3'-dimethoxy-4,4'-diamino-diphenyl. |
| Do | do | 4,4'-diamino-benzophenone. |
| Do | Acetoacetic acid 2 methyl anilide | 1,4-diaminobenzene. |
| Do | do | 1,3-diamino-benzene. |
| Do | do | 4,4'-diamino-diphenyl. |
| Do | do | 2,2'-dichloro-4,4'-diamino-diphenyl. |
| Do | do | 3,3'-dichloro-4,4'-diamino-diphenyl. |
| Do | do | 3,3'-dimethyl-4,4'-diamino-diphenyl. |
| Do | do | 3,3'dimethoxy-4,4'-diamino-diphenyl. |
| Do | do | 4,4'-diamino-benzophenone. |
| Do | do | 4,4'-diamino-stilbene. |
| Do | do | 3,3'-dimethoxy-4,4'-diamino-stilbene. |
| Do | do | 2,7-diamino diphenylene oxide. |
| Do | Acetoacetic acid 2-methyl-4-chloro-anilide. | Ethylene diamine. |
| Do | do | 1,4-phenylene diamine. |
| Do | do | 2,2'-dichloro-4,4'-diamino-diphenyl. |
| Do | do | 3,3'-dichloro-4,4'-diamino-diphenyl. |
| Do | do | 3,3'-dimethyl-4,4'-diamino-diphenyl. |
| Do | do | 3,3'-dimethoxy-4,4'-diamino-diphenyl. |
| Do | do | 2,7-diamino-fluorene. |
| Do | do | 2,7-diamino diphenylene-sulphone. |
| Do | do | 2,5-(4,4'-diamino-phenyl)-oxdiazole. |
| Do | do | 2,5-(4,4'-diamino-phenyl)-thiadiazole. |
| Do | Acetoacetic acid-2,4-dimethyl-anilide | Ethylene-diamine. |
| Do | do | 1,4-phenylene-diamine. |
| Do | do | 4,4'-diamino-diphenyl. |
| Do | do | 2,2'-dichloro 4,4'-diamino-diphenyl. |
| Do | do | 3,3'-dichloro-4,4'-diamino-diphenyl. |
| Do | do | 3,3'-dimethyl-4,4'-diamino-diphenyl. |
| Do | do | 3,3'-dimethoxy-4,4'-diamino-diphenyl. |
| Do | do | 2,6-diamino-naphthalene. |
| Do | do | 1,5-diamino-naphthalene. |
| Do | do | 4,4'-diamino-diphenyl ether. |
| Do | Acetoacetic acid-2-methoxy-anilide | Ethylene-diamine. |
| Do | do | 1,4-phenylene-diamine. |
| Do | do | 4,4'-diamino-diphenyl. |
| Do | do | 3,3'-dimethyl-4,4'-diamino-diphenyl. |
| Do | do | 3,3'-dichloro-4,4'-diamino-diphenyl. |
| Do | do | 3,3'-dimethoxy-4,4'-diamino-diphenyl. |
| Do | Acetoacetic acid-2-methyl-3-chloro-anilide. | Ethylene-diamine. |
| Do | do | 1,4-phenylene-diamine. |
| Do | do | 4,4'-diamino-diphenyl. |
| Do | do | 3,3'-dimethyl-4,4'-diamino-diphenyl. |
| Do | do | 3,3'-dichloro-4,4'-diamino-diphenyl. |
| Do | do | 3,3'-dimethoxy-4,4'-diamino-diphenyl. |
| Do | Acetoacetic acid-4-methyl-anilide | Ethylene-diamine. |
| Do | do | 1,4-phenylene-diamine. |
| Do | do | 4,4'-diamino-stilbene. |
| Do | do | 4,4'-diamino-benzanilide. |
| Do | do | 3,3'-dimethyl-4,4'-diamino-diphenyl. |
| Do | Acetoacetic acid-naphthyl-(2)-amide | Ethylele-diamine. |
| Do | do | 1,4-phenylene-diamine. |
| Do | do | 3,3'-dimethyl-4,4'-diamino-diphenyl. |
| Do | Acetoacetic acid-anilide | 1,4-diamino-benzene. |
| Do | do | 4,4'-diamino-diphenyl-methane. |
| Do | do | 4,4'-diamino-diphenyl. |
| Do | do | 2,2'-dichloro-4,4'-diamino-diphenyl. |
| Do | do | Ethylene-diamine. |
| Do | Acetoacetic acid-2,5-dimethoxy-4-chloro-anilide. | 4,4'-diamino-diphenyl. |
| Do | do | 3,3'-dimethyl-4,4'-diamino-diphenyl. |
| Do | do | 3,3'-dichloro-4,4'-diamino-diphenyl. |
| Do | do | 2,2'-dichloro-4,4'-diamino-diphenyl. |
| Do | do | 4,4'-diamino-benzophenone. |
| Do | Acetoacetic acid-naphthyl-(1)-amide | Ethylene-diamine. |
| Do | do | 1,4-diamino-benzene. |
| Do | do | 4,4'-diamino-diphenyl. |
| Do | do | 3,3'-dimethyl-4,4'-diamino-diphenyl. |

| Diazo component | Coupling component | Diamine |
| --- | --- | --- |
| 3-amino-4-chlorophthalic acid. | Acetoacetic acid-anilide | 1,4-diamino-benzene. |
| Do | do | Ethylene-diamine. |
| Do | Acetoacetic acid-2-methyl-4-chloro-anilide. | 1,4-diamino-benzene. |
| Do | do | 4,4'-diamino-diphenyl. |
| Do | Acetoacetic acid-2,5-dimethoxy-4-chloro-anilide. | Ethylene-diamine. |
| Do | do | 1,4-diamino-benzene. |
| Do | do | 4,4'-diamino-diphenyl. |
| 3-amino-4,5-dichloro-phthalic acid. | Acetoacetic acid-anilide | 1,4-diamino-benzene. |
| Do | do | 4,4'-diamino-diphenyl. |
| Do | do | Ethylene-diamine. |
| Do | Acetoacetic-2,5-dimethoxy-4-chloro-anilide. | 1,4-diamino-benzene. |
| Do | do | 4,4'-diamino-diphenyl. |
| Do | do | Ethylene-diamine. |
| Do | Acetoacetic acid-2,4-dimethyl-anilide. | 1,4-diamino-benzene. |
| Do | do | 4,4'-diamino-diphenyl. |
| Do | do | Ethylene-diamine. |
| 3-amino-6-methoxy-phthalic acid. | Acetoacetic acid-anilide | 1,4-diamino-benzene. |
| Do | do | Ethylene-diamine. |
| Do | Acetoacetic acid-2,5-dimethoxy-4-chloroanilide. | 1,4-diamino-benzene. |
| Do | do | 4,4'-diamino-diphenyl-methane. |
| Do | do | Ethylene-diamine. |
| Do | Acetoacetic acid-2-chloro-anilide | 1,4-diamino-benzene. |
| Do | Acetoacetic acid-2-methyl-anilide | Do. |
| Do | Acetoacetic acid-2-methoxy-anilide | Do. |
| Do | Acetoacetic acid-2-methyl-4-chloro-anilide. | Do. |
| Do | Acetoacetic acid-2,4-dimethyl-anilide. | Do. |

EXAMPLE 4

9.7 parts of the anhydride of the formula

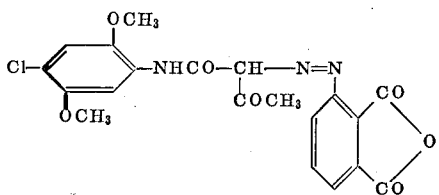

and 1.08 parts of 1.4-diamino-benzene are suspended in a mixture of 250 parts o-dichlorobenzene and 25 parts glacial acetic acid. The mixture is heated for 5 hours at 130–135° C., then cooled to 60° C., the product is filtered off with suction, washed with chlorobenzene at 60° C. and subsequently dried at 80° C. in a drying cabinet. The yield is 9.15 parts of a yellow pigment of the formula

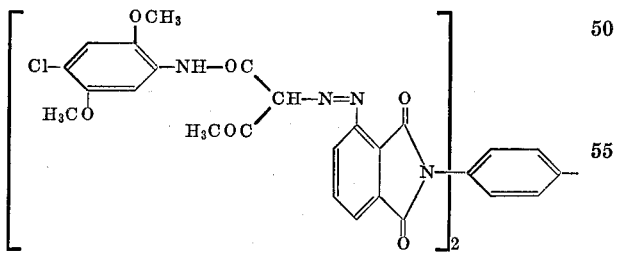

The pigment so obtained has an excellent fastness to migration in polyvinylchloride and fastness to heat up to temperatures of about 280° C. The pigment is very useful for the dyeing of acrylonitrile-etyrene-butadiene-copolymerisates and graft-copolymerisates.

EXAMPLE 5

9.7 parts of the anhydride of Example 4 and 0.6 part ethylene diamine are reflexed for 6 hours in a mixture of 500 parts o-dichloro-benzene and 50 parts glacial acetic acid. After cooling to 50–60° C. the precipitated pigment is filtered off with suction, washed with chlorobenzene and then dried in a drying cabinet at 80° C. Yield: 7.8 parts of pigment with very good fastness to light and heat.

EXAMPLE 6

9.8 parts of the azodyestuff of the formula

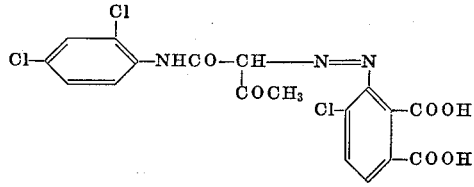

are heated for 1 hour at 130° C. in a mixture of 300 parts o-dichlorobenzene and 30 parts glacial acetic acid. 2.27 parts 4,4'-diaminobenzanilide are added and heating is continued for 5 hours. The precipitated pigment is filtered off with suction at 60° C. and washed with o-dichlorobenzene at 60° C. and subsequently dried at 80° C. in a drying cabinet. Yield: 10.1 parts of a yellow pigment with very good fastness properties.

EXAMPLE 7

8.0 parts of the anhydride of the formula

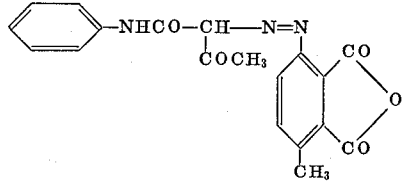

and 1.08 parts of 1,4-diamino-benzene are heated for 10 hours at 120° C. in a mixture of 200 parts p-xylene and 20 parts glacial acetic acid. The precipitated pigment is filtered off with suction at 60° C., washed with p-xylene at 60° C. and dried in a vacuum oven at 60° C. The yield is 7.8 parts of the pigment of the formula

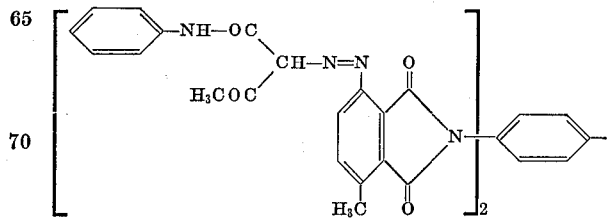

This pigment has a very good fastness to light and lacquer coating.

What is claimed is:

1. Azo dyestuffs which are free from sulphonic acid groups and which correspond to the formula:

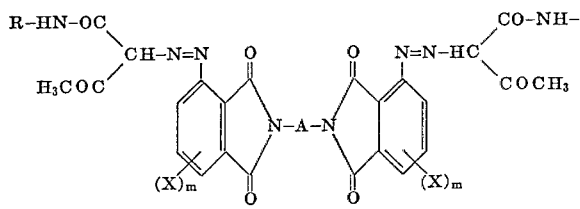

in which R stands for identical or different radicals selected from the group consisting of phenyl, naphthyl, 2-benzothiazolyl, substituted phenyl, substituted naphthyl radicals, and substituted 2-benzothiazolyl, wherein the substituents are methyl, chloro, nitro, methoxy, or ethoxy; X stands for identical or different substituents selected from the group consisting of lower alkyl, lower alkoxy, nitro, halo, trifluoromethyl, carbethoxy, methylsulphonyl, and cyano radicals; $m$ is an integer from 0 to 3; and A is selected from the group consisting of phenylene, diphenylene, phenylene-$R_4$-phenylene, substituted phenylene, substituted diphenylene, and substituted phenylene-$R_4$-phenylene wherein the substituents are selected from the group consisting of —Cl, —$CH_3$, —$OCH_3$, —$OC_2H_5$, and —$NO_2$, ethylene, naphthylene, and divalent radicals selected from the group consisting of

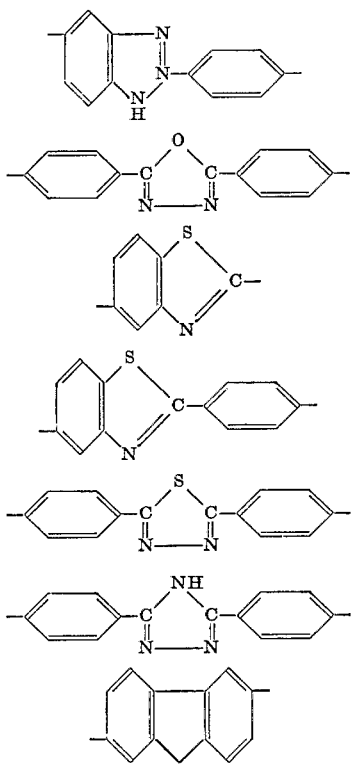

and

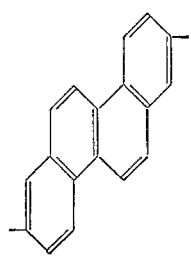

and wherein $R_4$ is selected from the group consisting of —O—, —$SO_2$—, $$-\overset{\overset{O}{\|}}{C}-$$

—$CH_2$—, —CH=CH—, —NHCO—, —$CH_2CH_2$—, —NHCONH—, and —N=N—.

2. Azo dyestuffs which are free from sulphonic acid groups and which correspond to the formula:

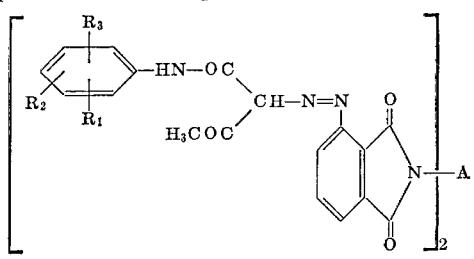

in which $R_1$ stands for a member taken from the class consisting of hydrogen, methyl, chloro, and methoxy groups; $R_2$ stands for a member taken from the class consisting of hydrogen, methyl, chloro, and nitro groups; and $R_3$ denotes radicals selected from the group consisting of hydrogen and chloro and wherein A represents a member taken from the class consisting of phenylene, diphenylene, phenylene-$R_4$-phenylene, substituted phenylene, substituted diphenylene, and substituted phenylene-$R_4$-phenylene wherein the substituents are selected from the group consisting of —Cl, —$CH_3$, —$OCH_3$, —$OC_2H_5$, and —$NO_2$, ethylene naphthylene, and divalent radicals selected from the group consisting of

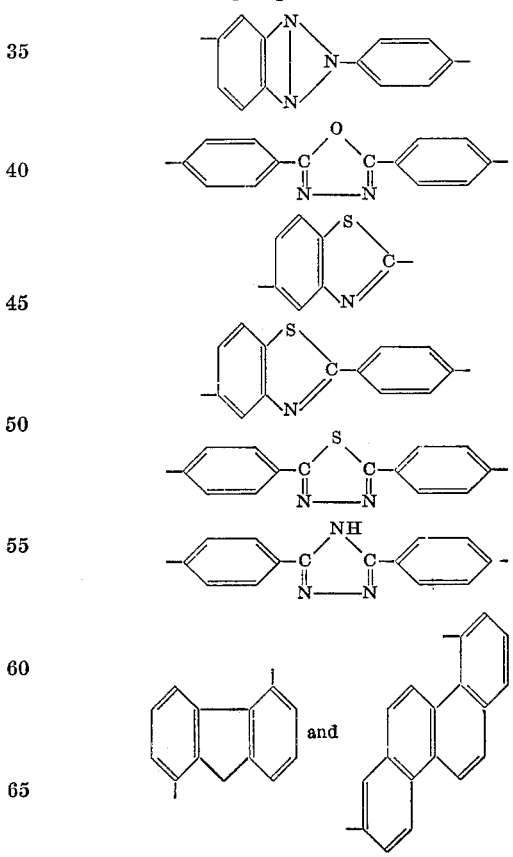

and wherein $R_4$ is selected from the group consisting of —O—, —$SO_2$—, $$-\overset{\overset{O}{\|}}{C}-$$

—$CH_2$—, —CH=CH—, —NHCO—, —$CH_2CH_2$—, —NHCONH—, and —N=N—.

3. The dyestuff of the formula
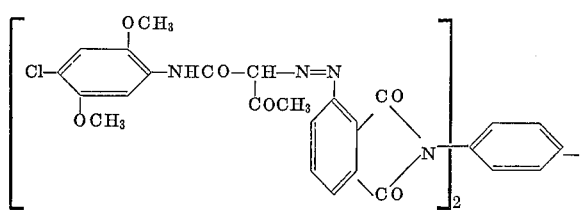
4. The dyestuff of the formula
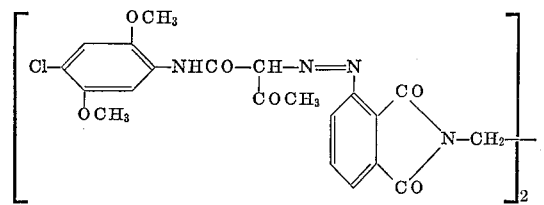
5. The dyestuff of the formula
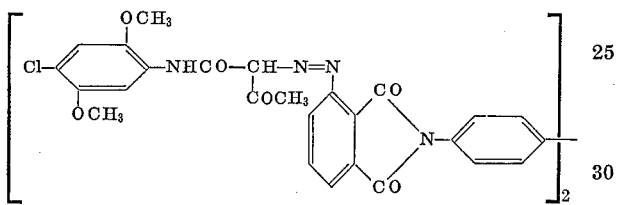
6. The dyestuff of the formula
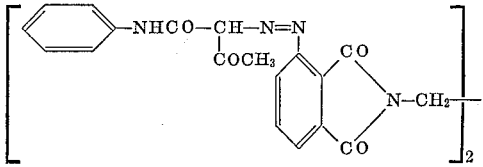
7. The dyestuff of the formula
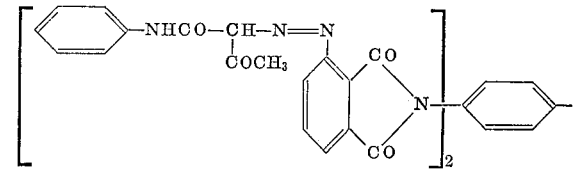
8. The dyestuff of the formula
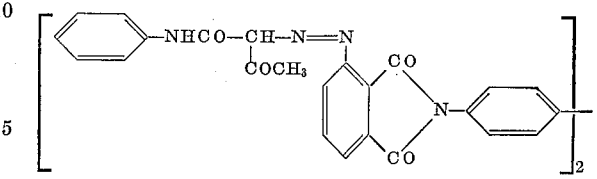
References Cited
FOREIGN PATENTS
652,251  12/1964  Belgium.
CHARLES B. PARKER, Primary Examiner
DONALD M. PAPUGA, Assistant Examiner
U.S. Cl. X.R.
8—4, 7, 41, 55; 106—22, 288; 260—37, 157, 158, 193